June 16, 1925.
W. B. LASKEY
PROCESS OF MAKING FILLED CANDY
Filed April 23, 1924
1,542,710
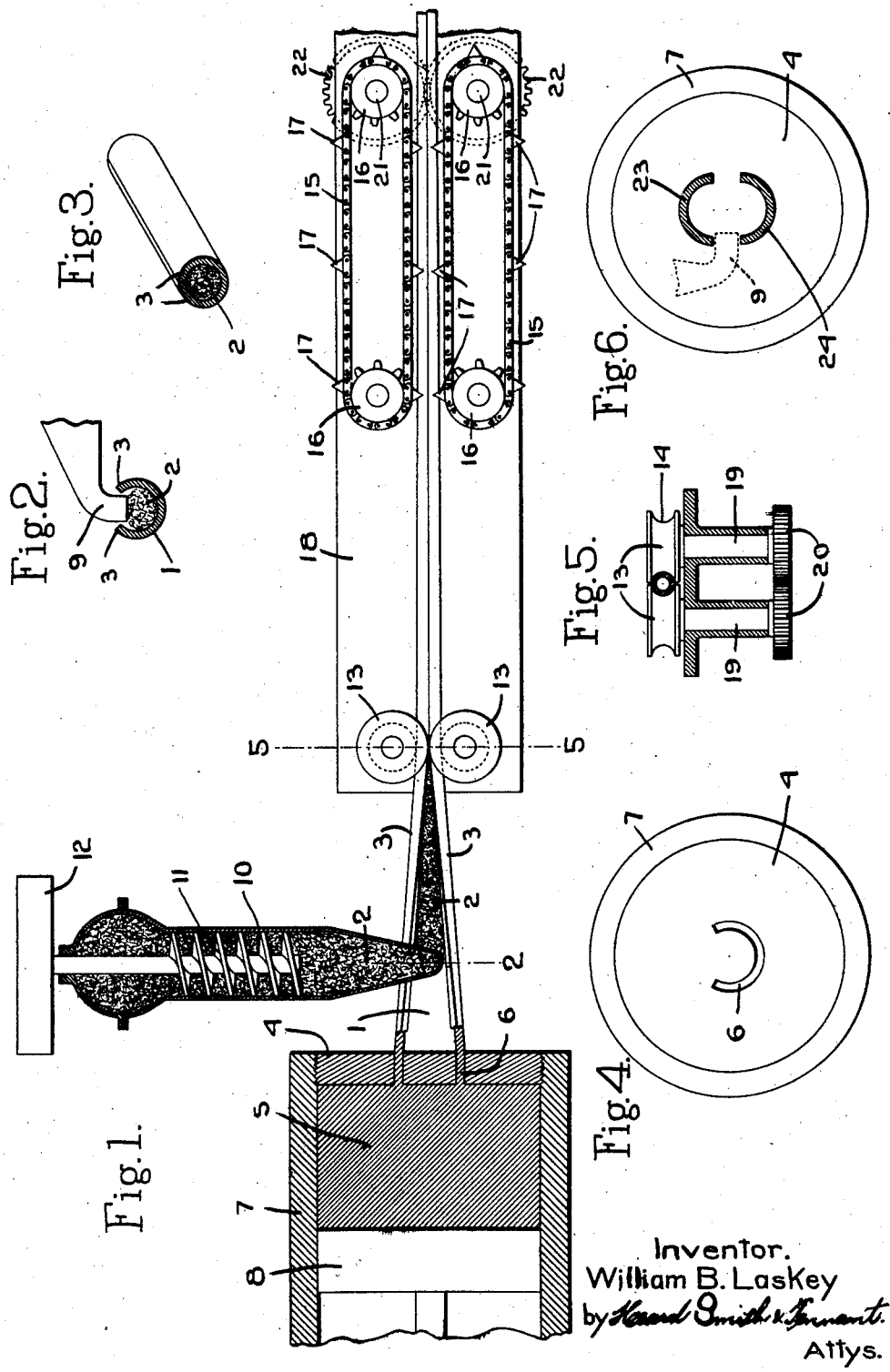
Inventor.
William B. Laskey
by Attys.

Patented June 16, 1925.

1,542,710

UNITED STATES PATENT OFFICE.

WILLIAM B. LASKEY, OF BROOKLYN, NEW YORK.

PROCESS OF MAKING FILLED CANDY.

Application filed April 23, 1924. Serial No. 708,348.

*To all whom it may concern:*

Be it known that I, WILLIAM B. LASKEY, a citizen of the United States, and resident of Brooklyn, county of Kings, State of New York, have invented an Improvement in Processes of Making Filled Candy, of which the following description, in connection with the accompanying drawing, is a specification, like characters on the drawing representing like parts.

This invention relates to a process of making so-called "filled candy," by which is meant candy in tubular form with the interior of the tube filled with some filling material such for instance as peanut butter.

My improved process consists in first forming a continuous strip or sheet of candy material and then laying thereon a strip of filling material and then progressively folding the strip about the filling material into tubular form. The preferred way of practising the invention is to form the strip continuously and to continuously lay the filling material thereon as fast as the strip is formed and then to progressively fold the edges of the strip about the filling material to form a tube of continuous length.

The continuous strip may be formed in any suitable way without departing from the invention. One convenient way is to form it by the extruding process, that is by extruding candy material in the form of a strip from an extruding machine. Also the filling material may be applied to the strip in any convenient way and the folding of the strip into tubular form may also be done by any appropriate means.

In order to give an understanding of my invention I have illustrated in the drawings more or less diagrammatically an apparatus by which the improved process may be carried out but I desire to state that the particular apparatus herein shown is not essential to the invention.

Fig. 1 is a plan view partly in section of a device by which my process may be carried out;

Fig. 2 is a section on the line 2—2, Fig. 1;

Fig. 3 shows the candy material after it is completed;

Fig. 4 is a view of the extruding die;

Fig. 5 is a section on the line 5—5, Fig. 1;

Fig. 6 shows a different form of extruding die which may be used in practising the invention.

In practising the invention a continuous strip 1 of candy material is first made and as this strip is formed filling material 2 is laid thereon preferably centrally thereof. After the filling material has been placed on the strip the edges 3 thereof are folded over until they meet thus forming a tubular piece of candy such as shown in Fig. 3 filled with the filling material 2.

Merely as illustrating one way in which this strip 1 may be formed I have shown herein an extruding machine comprising an extruding die 4 through which the candy material 5 is extruded. This die will have a slot 6 therein through which the candy material is extruded in the form of a continuous strip or web.

The die 4 is shown as forming the end of a cylinder 7 in which the candy material 5 is received and 8 indicates a plunger or piston which applies the pressure to the candy material necessary to force it through the slot 6. This slot 6 may have any desired shape so long as it forms a strip 1. In the drawings the slot is shown as curved so that the strip 1 which is delivered from the extruding die will have a trough shape. The strip, however, may be formed perfectly flat or in some other shape without departing from the invention.

Immediately after the strip 1 is formed and while it is still soft the filling material 2 is applied. This is herein shown as being accomplished by means of a nozzle 9 through which the filling material may be forced. This nozzle 9 is illustrated as connected to a container 10 into which the filling material is fed in some suitable way and in which operates a screw 11 that forces the filling material through the nozzle 9 and onto the strip 1. This screw is illustrated as being driven from a driving pulley 12.

The strip is continuously drawn past the nozzle 9 so that a continuous line or layer of filling material will be laid on the strip and after it leaves the nozzle the edges 3 are folded together to complete the tubular formation. This folding is herein shown as accomplished by means of folding or tube-forming wheels 13 which have concave peripheries 14 and which are so disposed that as the strip passes between them the edges 3 will be pressed together thus forming a tubular piece of candy. The candy material is still soft and tacky while it passes through the folding wheels and, therefore, when the edges 3 have been brought together they will adhere to each other thus making a permanent tube.

If desired, the candy may be pulled or drawn after it is formed into tubular shape and as illustrating one way of doing this I have shown a pair of pulling chains 15 passing around sprocket wheels 16, these chains being provided with projections 17 which by their engagement with the tubular candy serve to feed it forwardly and at the same time indent it so that when it is hard it can be readily broken at the indented points. If it is desired to pull the candy the pulling chains will be operated at a surface speed considerably greater than that at which the candy material is extruded so that the tubular candy will be subjected to a pulling action between the folding rolls and the pulling chains.

The folding rolls and pulling chains are shown as mounted in a table or support 18. The folding rolls are geared together, the shafts 19 thereof being provided with intermeshing gears 20. The pulling chains are also geared together so that they will operate in unison, the shafts 21 at the right hand end of the chains having intermeshing gears 22 thereon. The gears 20 and 22 may be driven by any suitable means.

In Fig. 6 I have shown a different way of practising the invention in which the candy strip is made in two parts between which the filling material is inserted and which are then brought into juxtaposition and properly shaped to form the candy tube. In the structure shown in Fig. 6 the extruding die would have two semi-circular oppositely-disposed slots so that the candy material would be extruded therefrom in two sections 23, 24 each having a trough shape. The filling material may be injected between the sections by means of the nozzle 9 after which the sections may be brought together and given the desired tubular shape.

From the above it will be seen that the process includes that of making continuously a strip of candy material, applying continuously filling material to the strip, and then progressively folding the strip into tubular shape and while in order to give an understanding of the invention I have illustrated more or less diagrammatically an apparatus by which it may be carried out yet I do not wish to be limited to the use of any particular apparatus.

I claim.

1. The process of making filled candy which consists in forming a continuous strip of candy material, applying filling material continuously to said strip, and then progressively folding the strip with the filling material thereon into tubular shape.

2. The process of making filled candy which consists in forming a continuous strip of candy material, applying filling material continuously to said strip, and then progressively folding the edges of the strip about the filling material into tubular shape.

3. The process of making filled candy which consists in forming a continuous trough-shaped strip of candy, placing filling material continuously in said trough-shaped strip as fast as it is formed and then folding the edges of the strip together.

In testimony whereof, I have signed my name to this specification.

WILLIAM B. LASKEY.